July 15, 1947.　　C. L. CARELOCK　　2,424,148
PEANUT HARVESTER
Filed Sept. 20, 1944　　5 Sheets-Sheet 1

INVENTOR.
Claude L. Carelock
BY Victor J. Evans & Co.
ATTORNEYS

July 15, 1947.  C. L. CARELOCK  2,424,148
PEANUT HARVESTER
Filed Sept. 20, 1944   5 Sheets-Sheet 4

INVENTOR.
Claude L. Carelock
BY Victor J. Evans & Co.
ATTORNEYS

July 15, 1947.                C. L. CARELOCK                2,424,148
                              PEANUT HARVESTER
                  Filed Sept. 20, 1944         5 Sheets-Sheet 5
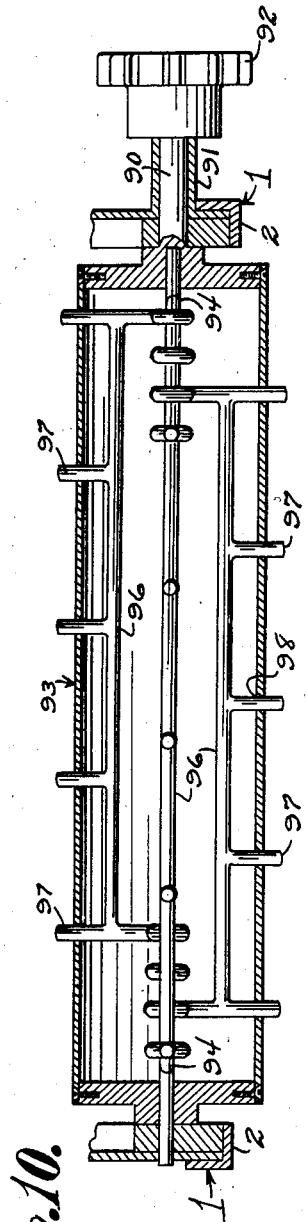
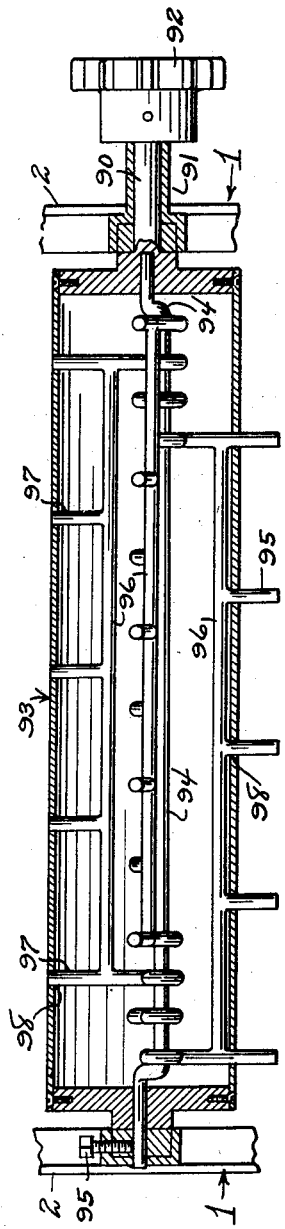
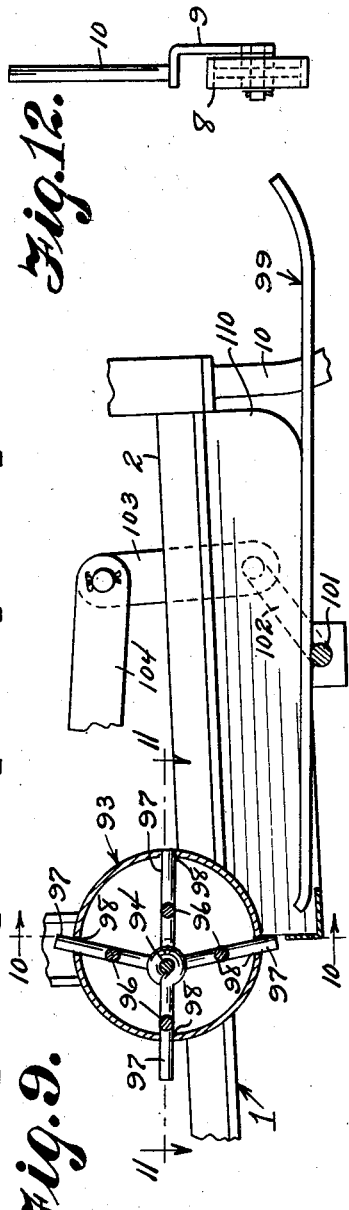
INVENTOR.
Claude L. Carelock
BY Victor J. Evans & Co.
ATTORNEYS Patented July 15, 1947

2,424,148

UNITED STATES PATENT OFFICE 2,424,148

PEANUT HARVESTER

Claude L. Carelock, Douglas, Ga.

Application September 20, 1944, Serial No. 554,952

8 Claims. (Cl. 55—51)

My present invention, in its broad aspect, has to do with improvements in peanut harvesters, and more particularly, it is my purpose to provide a peanut harvester with plow blades for harvesting the peanut vines and peanuts which are adjustable toward and away from each other, and vertically, and also movable into and out of proximity with the ground along with an adjustable frame; also in addition to providing an adjustable frame, I have provided unique and improved means in the form of eccentrically mounted and actuated fingers in a drum for taking the peanut vines from a conveyor and delivering the same to a periodically tilting or dumping platform whereby the peanuts are harvested and assembled in stacks or ricks for convenient handling.

My present harvester has means operatively associated with the axle of the ground wheels for raising the frame, and other means for locking and holding the frame in proper position, such means including as an element a device for adjustably supporting the frame on the axle. In addition, I provide clutch devices which operate to actuate the various elements of my invention including the frame hoist, conveyor, rotating drum for delivering the peanuts from the conveyor to the dumping platform, and the dumping platform only on forward motion of my harvester, and means whereby the dumping operation is rendered automatic and the interval between periods of operation of the platform adjustable.

Other objects and advantages of my invention may be briefly stated as follows: (1) to provide unique means for taking up slack and tensioning the link conveyor and belt drive devices; (2) to provide an improved releasable clevis whereby my harvester is automatically detached or uncoupled from a tractor or other powered vehicle if an obstacle is encountered; (3) to provide for triple adjustment of the harvesting plows or blades, (a) with respect to each other, (b) with respect to the vertical position of the supporting bar or rod for the plows or blades, (c) with respect to the frame to move the blades or plows to operative or inoperative positions; (4) to provide means for taking up slack in a unique and improved link conveyor with fingers, and (5) to provide a unique drum within which is a crank carrying supporting devices for pins whereby the pins are moved in and out from the drum to receive and discharge peanuts therefrom to the dumping platform.

Still other objects and advantages of my invention will be apparent from the detailed description taken in connection with the accompanying drawings, but I wish to emphasize that changes may be made in the specific construction shown and described in form, size, shape, construction and arrangement of parts without departing from my broad inventive concept or the scope of the appended claims.

In the drawings wherein I have illustrated a preferred form of my invention—

Figure 9 is a longitudinal section taken on the line 9—9 of Figure 3;

Figure 10 is a section on the line 10—10 of Figure 9;

Figure 11 is a section on the line 11—11 of Figure 9;

Figure 12 is a detail of the rear castor wheels.

In the drawings wherein like characters of reference are used to designate like or similar parts throughout the several views—

Figure 1:
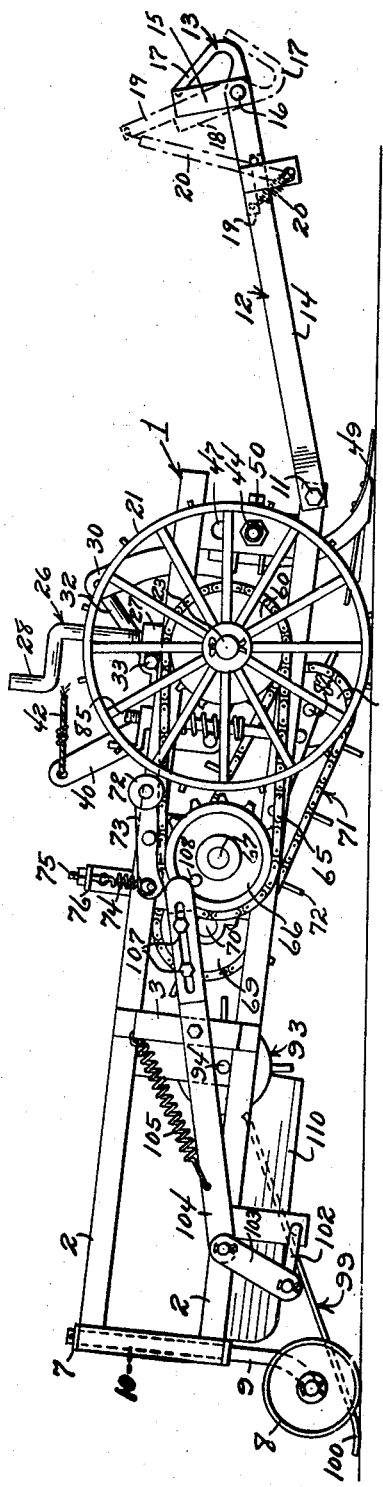
Figure 1 is a side elevation with the plows in operative position, taken from the right side.

The numeral 1 designates the frame of my peanut harvester which is rectangular in configuration and formed with superposed, spaced, side bars 2 with vertical reinforcing bars 3 and a rear end bar 4. A transverse intermediate bar 5 is also provided and crossed reinforcing members 6. Journalled as at 7 for swiveling movement at the corners of the rear end of the frame are rear castor ground wheels 8—see Figure 12—which are carried in L-shaped brackets 9 on supporting pins 10. Pivotally attached by bolts 11 to the side bars 2 at the forward part of the frame is a Y-shaped hitch 12 with a releasing clevis 13 for coupling with a powered vehicle such as a tractor (not shown). The side bars 14 of the hitch are joined to a connecting plate 15 at the front end to which is pivoted as at 16 a hook-shaped coupling 17 having a shank 18 coupled with a link 19 which is held by a spring 20 in position with the hook coupling 17 in the full line position of Figure 1. If an obstacle is encountered by my harvester, the pull of the spring is overcome permitting the coupling 17 to take the releasing position shown in dotted lines in Figure 1 to automatically release, disengage, or uncouple the harvester from the tractor (not shown).

Figure 2:
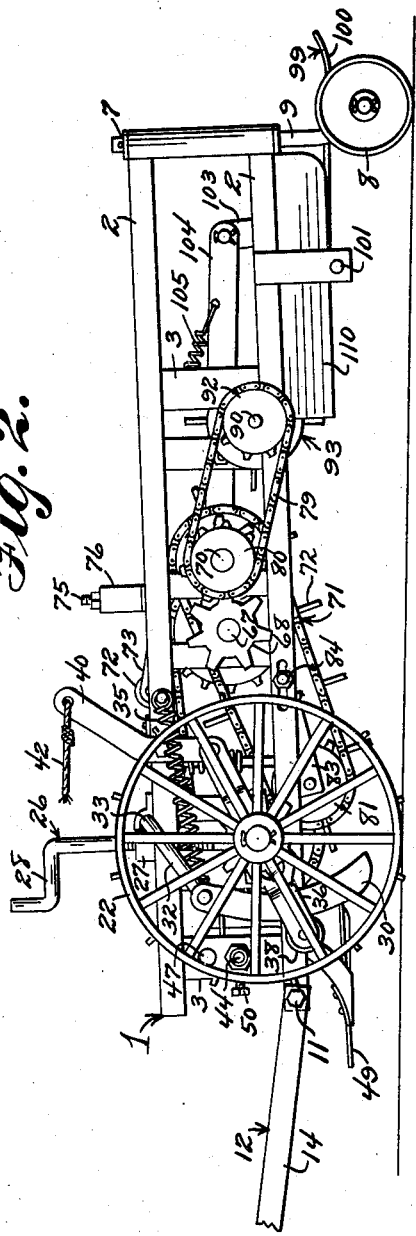
Figure 2 is a side elevation with the plows in inoperative position, taken from the left side.
Figure 3:
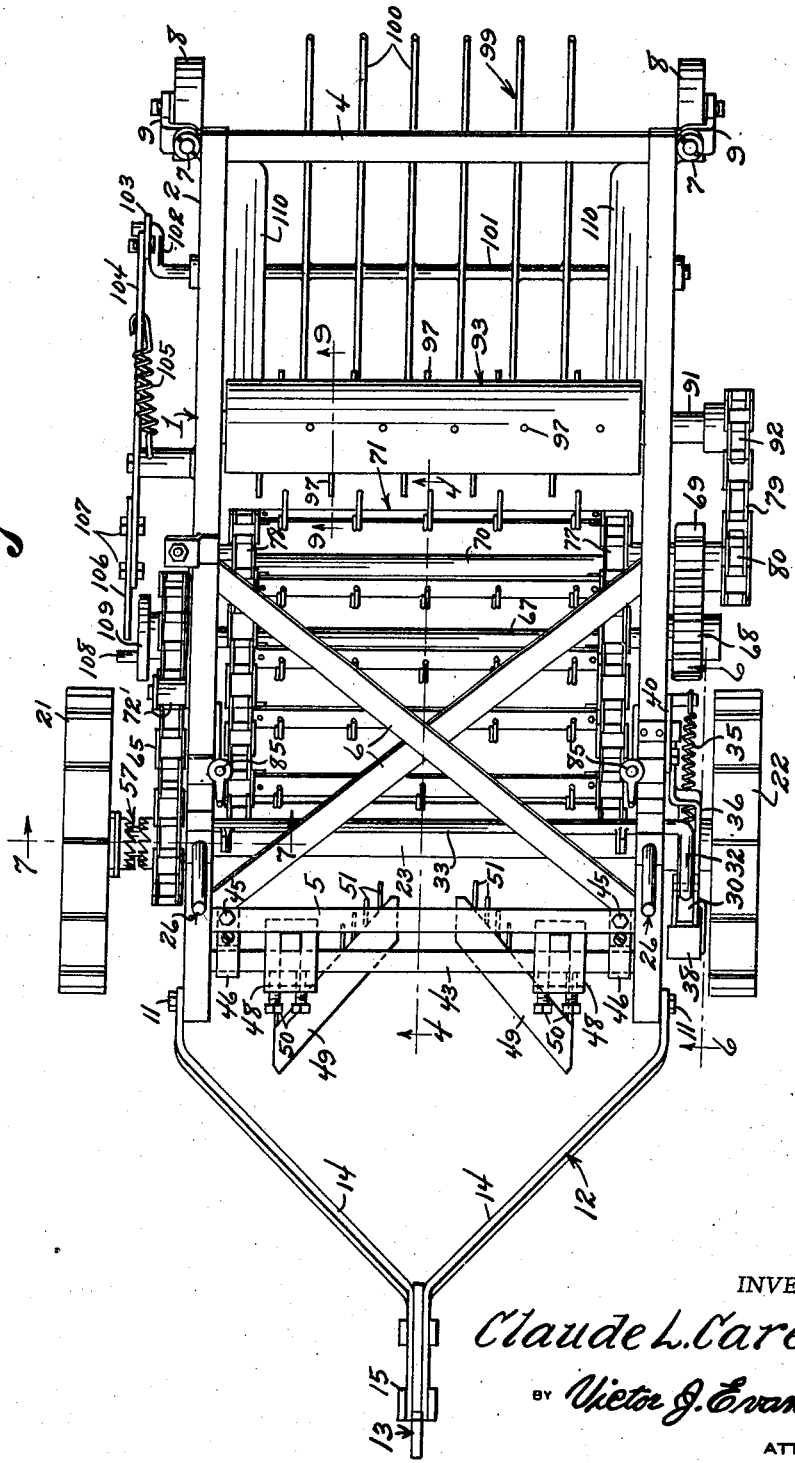
Figure 3 is a top plan view.
Figure 4:
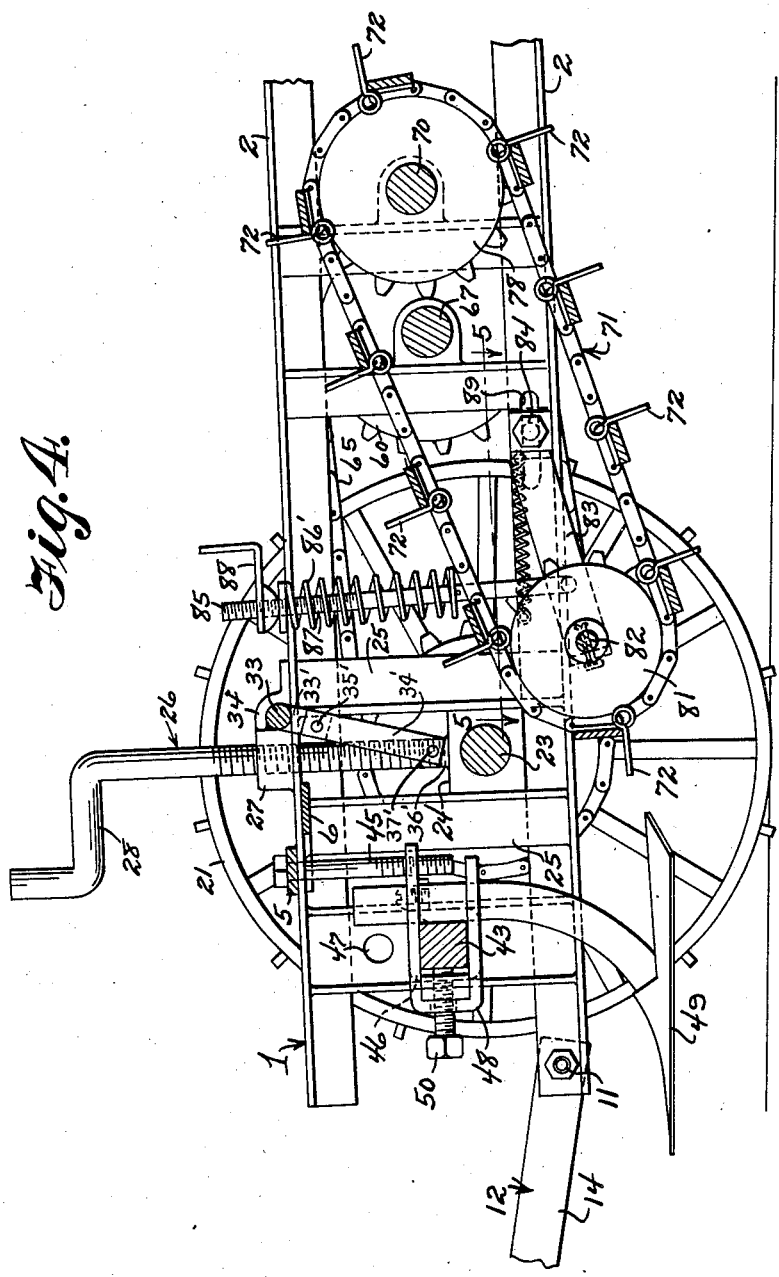
Figure 4 is a longitudinal section on the line 4—4 of Figure 3.
Figure 5:
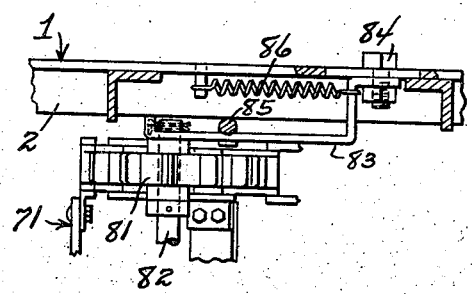
Figure 5 is a longitudinal section on the line 5—5 of Figure 4.
Figure 6:
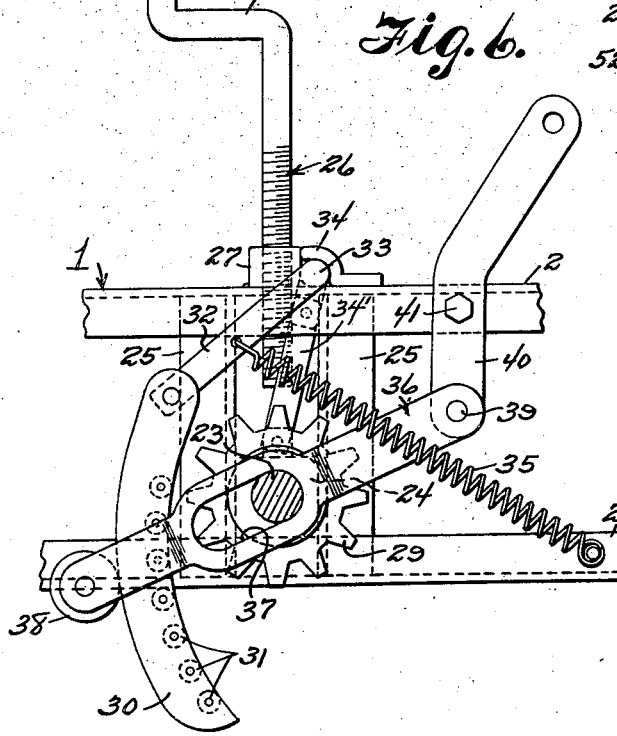
Figure 6 is a longitudinal section on the line 6—6 of Figure 3.

Adjacent the forward part of the frame are the relatively large ground wheels 21 and 22. The wheel 21 is fixed to the transverse axle 23 and the wheel 22 is free on the axle 23. The axle 23 is journalled in a pair of vertically slidable bearing blocks 24 mounted for movement in a vertical direction in the vertically spaced, parallel supports 25 fixed between the side bars 2 on each side of the frame. The frame 1 is therefore adjustable with reference to the axle 23 or vice versa. A pair of vertical threaded adjusting rods 26 are engaged in threaded bosses 27 on the side rails 2 of the frame and have handles 28. The lower ends of the rods 26 engage the top of blocks 24 to limit the upward movement of the blocks, and inversely to limit the downward movement of the frame with reference to the axle 23. Since the frame is heavy and unwieldy, a power lifting device for the frame includes a pinion 29 on the axle 23 adjacent the free wheel 22. An arcuate rack-like member 30 with uniformly spaced sleeved pins 31 is pivoted to an arm 32—see Figure 6—formed on the transverse rod 33 carried by brackets 34 on the frame 1. The rod 33 is provided with a crank arm 33' which is pivoted to the link 34' at 35' and the link 34' is pivoted to the hanger 36' secured to the blocks 24 at 37', which forms a toggle joint locked at center in Figures 4 and 6. A spring 35 having one end secured to the lower side bar of the frame, and the other end secured to the arm 32 normally tensions the arm. An operating member 36 is formed with a slot 37 through which axle 23 extends to pivot the same for movement about the axle and at the same time to allow limited adjustment of the member by reason of the slot. One end of the member 36 carries a roller 38 which engages the arcuate rack-like member 30 while the other end is pivotally coupled as at 39 to an operating lever 40 pivotally mounted as at 41 on the frame and having fixed to its upper end a cord or cable 42 leading to the operator on the tractor who by pulling the cord or cable 42 may move the member 36 to throw the arcuate rack-like member 30 into mesh with the pinion 29 on axle 23. The movement of the harvester over the ground powers the pinion 29 to move the arcuate member 30 upwardly to lift the frame 1. When the desired height is reached, the tractor is stopped and the rods 26 manually adjusted to hold the frame in raised position as shown in Figure 2.

A transverse bar 43 at the forward part of the frame 1 is bolted as at 44 to vertical bars 3 of the frame, and adjusting screw 45 carrying brackets 46 about the bar 43 maintains the bar 43 in sturdy adjusted position; there being several openings 47 in the bars 3 through which the bar 43 may be selectively positioned. Mounted for transverse adjustment toward and away from each other on the bar 43 are U-shaped brackets 48 carrying forwardly flared angular blades or plows 49. Set screws 50 are provided on the brackets to hold the same in adjusted position on the bar. The plows have rear trailing pins 51 to guide peanut vines cut thereby or plowed up. The plows are placed in proximity or engagement with or raised from the ground by adjustment of the frame.

Figure 7:
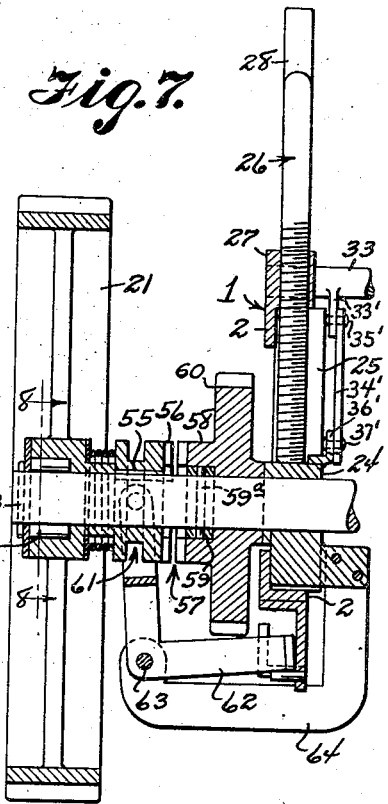
Figure 7 is a transverse section on line 7—7 of Figure 3.
Figure 8:
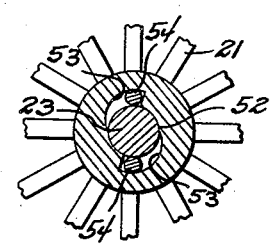
Figure 8 is a section on the line 8—8 of Figure 7 showing the over-run clutch.

A slip clutch 52—see Figure 8—with camming recesses 53 in which operate clutch pins 54 is effective on forward movement of wheel 21 to actuate shaft 23. Keyed as at 55 for sliding movement only on shaft 23 is a movable clutch element 56 of clutch device 57; the fixed element 58 of which is provided in a sleeve 59 pinned as at 59a—see Figure 7—to a pinion 60. The sliding clutch element 56 has a yoke and groove connection 61 with a bell crank lever 62 pivoted as at 63 to an L-shaped bracket 64 carried by the side bar 2 of frame 1, so that when the frame is moved down to engage the plows with the ground, the sliding clutch element 56 is moved to engage clutch element 58 to actuate pinion 60. A chain belt 65 is trained over pinion 60, and a pinion 66 on transverse shaft 67 to drive the same. Shaft 67 carries another pinion 68 on its opposite end meshing with a pinion 69 on the operating shaft 70 for an endless belt conveyor 71 of the link type having pins 72 for picking up the peanut vines harvested by plows 49. A belt tightener including a roller 72' on a rocking arm 73 pivoted to the frame tensions the belt 65 and the proper pressure is supplied by a spring 74 attached to an adjusting bolt 75 carried by a bracket 76 on the frame, and to which the spring is attached, see Figure 1. The link conveyor is carried on shaft 70 by a pair of pinions 77 and 78, and another chain belt 79 is trained over a pinion 80 on a shaft 70. The forward end of link conveyor 71 is trained over pinions 81 on a shaft 82 carried on adjustable arms 83 pivoted by bolts 84 to the frame, and adjustable vertically by rods 85. Spring tensioning devices 86 normally draw the arms 83 forwardly to tension the link conveyor 71. Rods 85 carry springs 86' and are threaded as at 87 to receive an adjusting member 88 to position the shaft 28. A slot 89 is provided in frame 1 for adjustably receiving the bolt 84.

A shaft 90 is journalled in frame 1 and has a sleeve 91 on which pinion 92 is pinned to drive a drum 93 through the medium of chain belt 79—see Figures 9, 10 and 11. A crank rod 94 is fixed by a set screw 95 to frame 1 and the drum revolves about the crank. Mounted on the crank are four (or more) members 96 having spaced pins 97 which pass through openings 98 in the drum. As the drum revolves pins 97 are moved in and out of the drum to receive peanut vines and the like from the link conveyor and drop the same on the assembling platform 99.

The platform 99 is formed with a plurality of spaced bars 100 mounted on a shaft 101 which is pivoted on the frame and is formed with a crank arm 102 at one end which is connected with a link 103 pivoted to a lever 104 tensioned by spring 105, and which has a plate 106 adjustably mounted as at 107 on the end thereof to be engaged by a pin 108 on the rotating disc 109 on shaft 67. The pin 108 engages the plate 106 as the conveyor is operated to periodically pivot or dump the platform 99 to form stacks or ricks. By adjusting the plate 106 the interval of pivoting or dumping can be regulated. Inwardly and downwardly sloping side guide plates 110 are provided on the frame above the platform to prevent displacement of the contents from the platform.

From the foregoing, it is believed that the operation and advantages of my invention will be apparent, but it is again emphasized that interpretation of its scope should only be conclusive when made in the light of the subjoined claims.

I claim:

1. A peanut harvester, comprising a vertically adjustable frame, a pair of vertically adjustable plow blades adapted to be relatively adjusted with relation to each other carried by the frame, a conveyor, a tiltable stacking platform, and a peanut transferring drum all mounted on the frame, an axle carrying traction wheels, operative connections with the axle from the conveyor to drive the same, operative connections from the conveyor to the drum to drive the same, and means connected with the tilting platform for periodically actuating the same to dump the contents therefrom in a stack.

2. A peanut harvester, comprising a vertically adjustable frame, an axle, traction wheels on the axle, means connected with the axle for vertically moving the frame, means for actuating said means, a pair of angularly arranged plow blades relatively adjustable to each other in a horizontal direction, and vertically adjustable as a unit, an endless conveyor, a tiltable stacking platform, and a rotatable transferring drum between the conveyor and the stacking platform, all mounted on the frame, means connecting the conveyor with the axle to drive the same, means connecting the drum with the conveyor to actuate the same, means mounted on the frame for periodically tilting the platform to dump the contents therefrom in a stack, clutch means mounted on the axle for controlling the operation of said conveyor and drum, and means mounted on the frame for holding the frame in vertically adjusted position.

3. The invention as defined in claim 2, wherein the axle is journalled for vertical movement with respect to the frame, means including a pinion on the axle and a rack connected with the frame for vertically moving the frame with reference to the axle, and threaded rods on the frame engaging the journal means of the axle to hold the frame in adjusted position.

4. The invention as defined in claim 2, wherein the conveyor has belt and pinion connections with the axle, a clutch device for actuating the same, means for taking up slack in the conveyor, and means for vertically adjusting the conveyor.

5. The invention as defined in claim 2, wherein the plow blades are mounted on brackets, a vertically adjustable bar on the frame carrying the brackets, and means for adjusting the brackets on the bar to adjust the plow blades with respect to each other.

6. The invention as defined in claim 2, wherein the stacking platform is formed with spaced bars mounted on a tilting shaft carried by the frame, a disc carrying a pin operatively connected to the axle, the tilting shaft having a lever engaged by the pin to tilt the same periodically, and means for adjusting the period of the tilting operation.

7. The invention as defined in claim 2, wherein the drum has a crank mounted therein carrying pin supports, the pins of which extend through the drum and are retractable and outwardly movable as the drum is revolved.

8. The invention as defined in claim 2, wherein a clevis is provided to attach the frame to a tractor, a hook on the clevis, and spring means, the tension of which holds the hook in normally coupling position to be automatically moved to disconnecting position to uncouple the frame against the tension of the spring when the harvester engages an obstacle.

CLAUDE L. CARELOCK.

REFERENCES CITED

The following references are of record in the file of this patent:

UNITED STATES PATENTS

| Number | Name | Date |
| --- | --- | --- |
| 2,054,501 | Grinslade | Sept. 15, 1936 |
| 1,501,379 | Teter | July 15, 1924 |
| 2,172,435 | Cook | Sept. 12, 1939 |
| 669,908 | Williams | Mar. 12, 1901 |
| 1,266,752 | Altgelt | May 21, 1918 |
| 2,204,241 | Young | June 11, 1940 |
| 953,929 | Stitchman | Apr. 5, 1910 |
| 1,518,826 | Teter | Dec. 9, 1924 |
| 2,095,428 | Batie | Oct. 12, 1937 |
| 2,080,336 | Powell | May 11, 1937 |
| 1,919,915 | Strandlund | July 25, 1933 |